United States Patent
Sandstedt

(10) Patent No.: US 9,708,911 B1
(45) Date of Patent: Jul. 18, 2017

(54) GYROSCOPIC INTERNAL COMBUSTION ENGINE

(71) Applicant: Gary O. Sandstedt, St. Louis, MO (US)

(72) Inventor: Gary O. Sandstedt, St. Louis, MO (US)

( * ) Notice: Subject to any disclaimer, the term of this patent is extended or adjusted under 35 U.S.C. 154(b) by 246 days.

(21) Appl. No.: 14/501,600

(22) Filed: Sep. 30, 2014

(51) Int. Cl.
  *F01C 9/00* (2006.01)
(52) U.S. Cl.
  CPC .................................. *F01C 9/002* (2013.01)
(58) Field of Classification Search
  CPC ........... B60K 6/30; B60K 6/105; B60L 11/16; B60W 20/00; Y02T 10/7033; Y02T 10/6024; Y10T 74/2117
  See application file for complete search history.

(56) References Cited

U.S. PATENT DOCUMENTS

| | | | | |
|---|---|---|---|---|
| 3,672,244 A * | 6/1972 | Nasvytis | ................ | B60K 6/105 180/165 |
| 3,858,674 A * | 1/1975 | Tabor | ...................... | B60K 1/00 180/165 |
| 3,949,556 A * | 4/1976 | Wallis | .................... | B60K 6/105 60/709 |
| 4,131,171 A * | 12/1978 | Keyes | .................... | B60K 6/105 180/165 |
| 4,171,029 A * | 10/1979 | Beale | ..................... | B60K 6/105 180/54.1 |
| 4,252,208 A * | 2/1981 | Heidemeyer | .......... | B60K 6/105 180/165 |
| 4,282,948 A * | 8/1981 | Jerome | ................... | B60K 6/105 180/165 |
| 4,393,964 A * | 7/1983 | Kemper | ................. | B60K 6/105 192/3.58 |
| 4,499,965 A * | 2/1985 | Oetting | .................. | B60K 6/105 180/165 |
| 5,282,356 A * | 2/1994 | Abell | ...................... | F02C 3/165 416/21 |
| 5,636,509 A * | 6/1997 | Abell | ...................... | F02C 3/165 415/63 |
| 6,167,850 B1 * | 1/2001 | Blount | ...................... | F01B 9/06 123/44 D |
| 6,457,451 B1 | 10/2002 | Sakita | | |
| 6,476,529 B1 * | 11/2002 | Tilbor | .................... | H02K 7/025 310/112 |
| 6,526,925 B1 | 3/2003 | Green, Jr. | | |
| 6,588,395 B2 | 7/2003 | Defazio | | |
| 6,705,202 B2 | 3/2004 | Harcourt et al. | | |
| 6,819,012 B1 * | 11/2004 | Gabrys | .................. | H02J 9/066 307/68 |
| 7,416,039 B1 * | 8/2008 | Anderson | ................ | B60K 1/00 180/165 |
| 8,180,511 B2 * | 5/2012 | Bowman | ................ | B60K 6/105 701/101 |

(Continued)

OTHER PUBLICATIONS

U.S. Appl. No. 14/088,424, Joseph Vengen.

*Primary Examiner* — Joshua Kennedy

(57) ABSTRACT

An internal combustion engine, configured in the form of an enclosed powered flywheel, operating in a horizontal plane, which functions both as an on-board gyroscope, to stabilize a vehicle from rolling over, and to simultaneously provide vehicular locomotion, through a power train, with the flywheel rotated by at least one fueled piston, of a hosting combustion chamber, internal to the flywheel.

18 Claims, 3 Drawing Sheets

(56) References Cited

U.S. PATENT DOCUMENTS

| | | | |
|---|---|---|---|
| 8,275,529 B2 * | 9/2012 | Bowman | B60K 6/105 180/65.21 |
| 8,708,081 B1 * | 4/2014 | Williams | B60K 6/105 180/165 |
| 8,738,217 B2 * | 5/2014 | Banker | B60W 20/00 701/29.1 |
| 8,850,791 B2 * | 10/2014 | Chen | F02C 3/165 60/39.34 |
| 9,050,968 B2 * | 6/2015 | Jacobson | B60W 10/24 |
| 9,358,865 B1 * | 6/2016 | Sherry | B60K 6/105 |
| 2009/0020354 A1 * | 1/2009 | Roth | B60K 6/30 180/291 |
| 2014/0305388 A1 * | 10/2014 | Gay | B60W 10/02 123/2 |
| 2015/0060172 A1 * | 3/2015 | Manganaro | H02K 7/025 180/165 |
| 2015/0144103 A1 * | 5/2015 | Vengen | F02B 59/00 123/43 R |

* cited by examiner

GYROSCOPIC INTERNAL COMBUSTION ENGINE

FIELD OF INVENTION

This invention describes an internal combustion engine, configured to stabilize a vehicle from rolling over, while simultaneously providing a means of locomotion.

BACKGROUND OF THIS INVENTION

This invention further describes a type of internal combustion engine, simpler in design, easier to operate, and maintain, that maximizes fuel efficiency, by controlling when combustion occurs, as it works in concert with the application of stored kinetic energy, under the direction of a data processor, with other drive components, to help maintain the rolling stability of a host vehicle.

A multitude of conventional and rotary internal combustion engines have been invented and designed, centering on their mechanical intricacies.

This invention also addresses how the production and management of energy is utilized, as it relates an internal combustion engine, when powering a vehicle, including such items as:

1. Automatically modulating the ratio between combustion and kinetic energy to propel a vehicle, most efficiently.
2. Making an internal combustion engine part of a larger system, that promotes safety.
3. Controlling when, and how fossil fuel is used to move a vehicle.
4. Storing, reclaiming and utilizing excess energy, otherwise lost.

OBJECTS OF THIS INVENTION ARE TO

A. Reduce the possibility of a vehicular roll-over.
B. Manage the control of energy use.
C. Utilize a variety of diverse fuels.
D. Reduce pollution.
E. Produce a superior engine at a lower cost.
F. Burn no fossil fuels when a host vehicle is not in motion. but on the ready to instantly move.

PRIOR ART DISCUSSION

There have been many attempts to simplify or replace the internal combustion engine as presently configured. For more than one-hundred years, the basic design of the internal combustion engine and its support elements have not substantially changed.

Attempts have been made with the Wankel rotary internal combustion engine intended to replace the piston engine in automobiles, and other vehicles.

However, it has not achieved wide usage due to inherent design limitations that restrict power, and cause excessive wear.

Turbine technology for automobiles has been tried without success, mainly due to a lack of acceleration from a standing start, and heavy fuel consumption at low speeds.

Hybrid technology, combining an electric motor working in concert with an internal combustion engine is costly, and not a long term solution for cutting fuel consumption, and in addition, it carries the burden of a conventional engine design, complicated with the addition of electric motors.

PRIOR ART REFERENCES CITED

U.S. Pat. Nos. 6,167,850 6,457,451 6,526,925 6,588,395 6,705,202, and patent application Ser. No. 14/088,424.

U.S. Pat. No. 6,167,850, issued on Jan. 2, 2001, to inventor David Blount, describes an apparatus for producing rotary motion by means of an internal combustion engine with reciprocating pistons in a circular rotor.

U.S. Pat. No. 6,526,925 issued on Mar. 4, 2003, to Willie A. Green, Jr., describes a rotary device, functional as an internal combustion engine, with pistons radially extending out, having arms to drive a star wheel that rotates a shaft.

U.S. Pat. No. 6,457,451 issued on Oct. 1, 2002, to Masami Sakita, describes a rotary engine with piston assemblies that rotate at different speeds.

U.S. Pat. No. 6,588,395 issued on Oct. 1, 2002, to Robert Defazio, describes a internal combustion engine having a circular cavity with a rotatable flywheel defining, attached power pistons.

U.S. Pat. No. 6,705,202 issued on Mar. 16, 2003, to Dougal Lamont Harcourt, describes a rotatable member with one or more cylinders disposed tangentally positioned around its circumference.

Pending application Ser. No. 14/088,424 of inventor Joseph Vengen, filed on Nov. 24, 2013, describes an odd number of pistons used internally to rotate an engine block, and turn a drive shaft.

IN SUMMATION

Prior art does not disclose the system of this invention, which, in addition to being utilized as a vehicular stabilizing gyroscope, and simultaneously as a means of vehicular locomotion, it also employs means to determine how and when energy is applied, under control of a data processor, to maximize fuel efficiency.

DESCRIPTION OF AN EMBODIMENT

Figure 1:
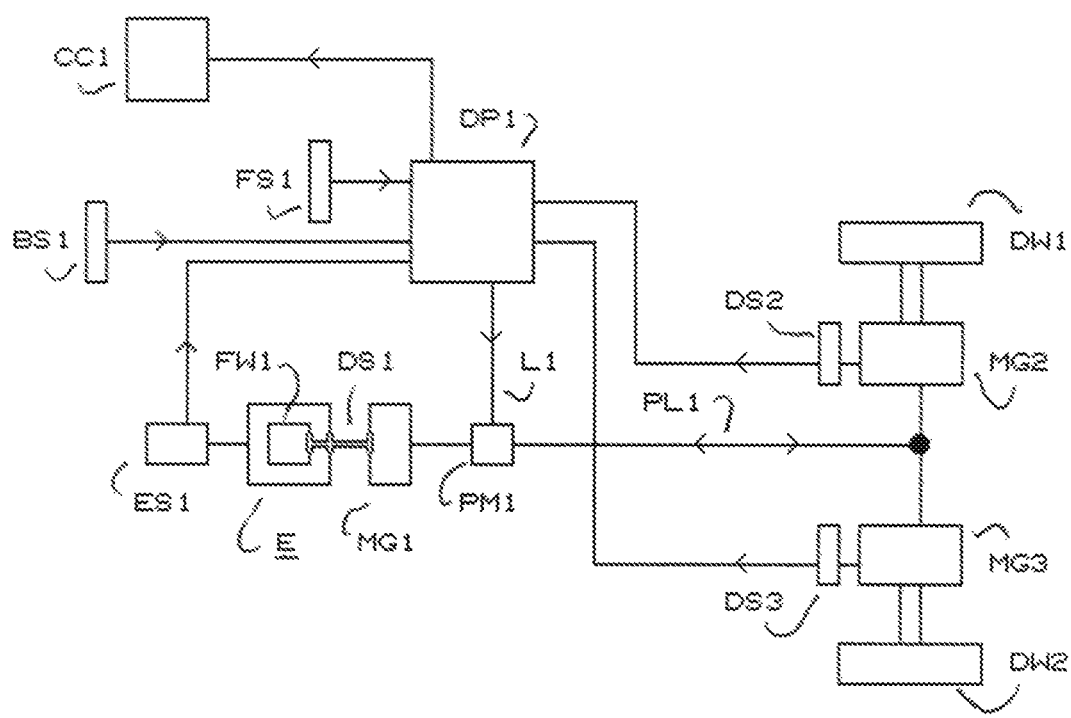
FIG. 1, shows a block diagram of a gyroscopic internal combustion engine operating system.

FIG. 1, shows a block layout of internal combustion flywheel engine E, and its operating system.

Drive shaft DS1, connects flywheel FW1, of engine E, to motor-generator MG1, which, through supply line PL1, and bi-directional current flow modulator PM1, controlled by data processor DP1, over signal line L1, powers motor-generator drive wheel assemblies MG2-DW1, and MG3-DW2.

Data from built-in sensors DS2 and DS3, of respective motor-generator drive wheel assemblies MG2-DW1, and MC3-DW2, along with engine sensor ES1, braking sensor BS1, and fuel feed sensor FS1, working in concert, enable connected data processor, DP1, through its operating program, to determine the back and forth bi-directional current flow between motor-generator MG1, and motor-generator drive wheel assemblies, MG2-DW1, and MG3-DW2.

When fossil fuel is not being burned to spin flywheel FW1, of engine E, while a host vehicle is in motion, energy is reverse fed from motor-generator drive wheel assemblies MG2-DW1 and MG3-DW2, to power flywheel engine motor-generator MG1, through supply line PL1, and bi-directional current modulator PM1, under control of data processor DP1, through signal line L1.

This function accelerates the rotation of engine E, flywheel FW1, also of FIGS. 2, and 3, as a means to store energy for later use, and reduce the burning of fossil fuel.

At a stop light, or in a traffic backup, fossil fuel burning is temporarily suspended, without loss of performance, since stored rotating energy of engine E, flywheel FW1, provides ready acceleration when vehicle motion is resumed.

Figure 2:
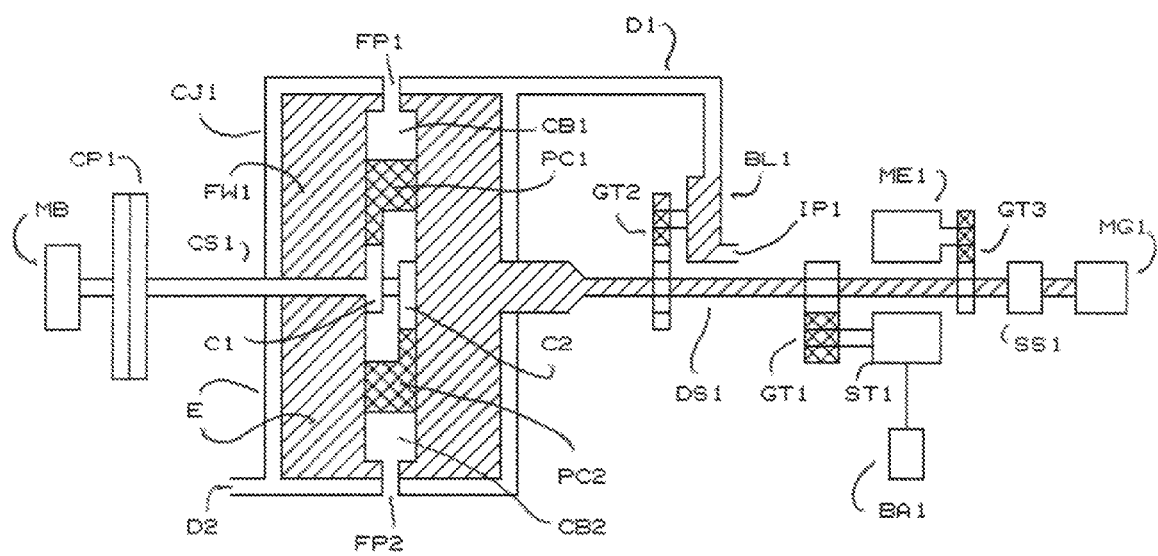
FIG. 2, shows a cross section of an air cooled gyroscopic internal combustion engine system.
Figure 3:
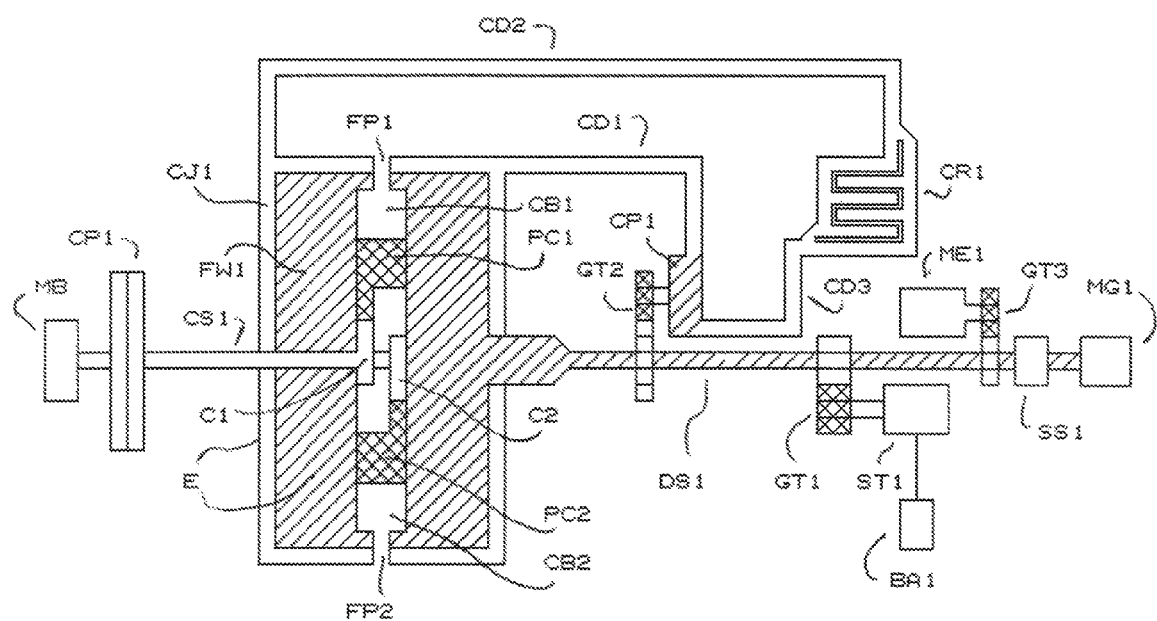
FIG. 3, shows a cross section of a liquid cooled gyroscopic internal combustion engine system.

Clutch control CC1, function of data processor DP1, determines when to disengage cam shaft CS1, from mounting base MB1, of FIGS. 2, and 3, allowing flywheel FW1, to freely spin, in the absence of fossil fuel usage, as a means to reduce drag by respective pistons PC1, and PC2, working against static cams C1, and C2, of cam shaft CS1, also of FIGS. 2, and 3.

Arrows on sensor control lines of FIG. 1, feeding data processor DP1, indicate the direction of signal flow, and arrows on supply line PL1, also of FIG. 1, indicate bi-directional current flow.

FIG. 2, shows a profiled cross section of flywheel engine E, with flywheel FW1, encased by combination enclosure-cooling jacket CJ1.

Combustion chambers CB1, and CB2, of flywheel FW1, host respective rotating piston assemblies PC1, and PC2, which engage respective cams C1, and C2, of cam shaft CS1.

Fuel is fed into combustion chambers CB1, and CB2, through respective input ports FP1, an FP2.

Drive shaft DS1, of flywheel engine E, turns under power, during fuel usage, when cam shaft DS1, is held static by mounting base MB1, through engaged clutch CP1.

With clutch CP1, disengaged, in the absence of fuel burning, flywheel FW1, freely spins, and continues to energize motor-generator MG1, through drive shaft DS1, and power motor-generator drive wheel assemblies MG2-DW1, and MG3-DW2, of FIG. 1.

Clutch CP1, disengages cam shaft CS1, under control of data processor DP1, to prevent the continuing compression of piston assemblies PC1, and PC2, hosted in respective combustion chambers CB1, and CB2, of flywheel FW1, which would otherwise burden and slow the rotation of flywheel FW1, thus siphoning off power needed to efficiently drive and rotate motor-generator MG1.

Gear train GT1, connects drive shaft DS1, to starter motor ST1, powered by battery BA1.

Gear Train GT3, connects magneto ME1, to drive shaft DS1.

Spring starter motor SS1, is part of drive shaft DS1.

Jacket CJ1, encasing flywheel FW1, provides the means to facilitate the cooling of engine E, with forced air through input port IP1, by blower BL1, powered by drive shaft DS1, through gear train GT2, with exhaust air expelled from cooling jacket CJ1, through duct D2.

FIG. 3, shows a profiled cross section of flywheel engine E, with flywheel FW1, encased by combination enclosure-cooling jacket CJ1.

Combustion chambers CB1, and CB2, of flywheel FW1, host respective rotating piston assemblies PC1, and PC2, which engage respective cams C1, and C2, of cam shaft CS1.

Fuel is fed into combustion chambers CB1, and CB2, through respective input ports FP1, and FP2.

Drive shaft DS1, of flywheel engine E, turns under power, during fuel usage, when cam shaft CS1, is held static by mounting base MB1, through engaged clutch CP1.

With clutch CP1, disengaged, in the absence of fuel burning, flywheel FW1, freely spins, and continues to energize motor-generator MG1, through drive shaft DS1, and power motor-generator drive wheel assemblies MG2-DW1, and MG3-DW2, of FIG. 1.

Clutch CP1, disengages cam shaft CS1, under control of data processor DP1, to prevent the continuing compression of piston assemblies PC1, and PC2, hosted in respective combustion chambers CB1, and CB2, of flywheel FW1, which would otherwise burden and slow the rotation of flywheel FW1, thus siphoning off power needed to efficiently drive and rotate motor-generator MG1.

Gear train GT1, connects drive shaft DS1, to starter motor ST1, powered by battery BA1.

Gear train GT3, connects magneto to drive shaft DS1.

Spring starter motor SS1, is part of drive shaft DS1.

Further connected to engine E, drive shaft DS1, is gear train GT2, which powers liquid cooling pump CP1.

Flywheel engine E, with cooling jacket CJ1, in a closed loop with radiator CR1, and pump CP1, are connected respectively through ducts CD1, CD2, and CD3, to facilitate engine liquid cooling.

IN CONCLUSION

The drawings and concepts depicted and described herein, are just one means, of many, for implementing the claims of this invention.

What is claimed:

1. An internal combustion engine comprising;
   (A) a flywheel system of a vehicle, operating in a horizontal plane and functioning both as an on-board gyroscope to stabilize a vehicle from rolling over and simultaneously providing vehicular locomotion;
   (B) a flywheel containing at least two opposing combustion chambers, each hosting a rotating piston assembly, with each piston having a connected extension, engaging a respective offset cam of a cam shaft, which is static during the application of fuel usage and freely spinning at all other times by the release of a first clutch plate attached to the cam shaft from opposing second clutch plate secured to a stationary anchor, under control of a data processor;
   (C) a flywheel extension opposite a flywheel centered cam shaft in the form of a flywheel centered drive shaft of a lesser diameter than the flywheel and directly connected to a first motor-generator, which, in fueled operation, through a data processor controlled bi-directional current flow switch, passes current flow to at least one mechanically connected second motor-generator assembly over a supply line to directly drive at least one traction wheel of a vehicle;
   (D) the flywheel encased by a cooling jacket, the cooling jacket either:
      (i) being in a closed circuit loop with a cooling radiator and a liquid circulating pump to facilitate engine cooling, or
      (ii) having an input port connected to a forced air blower to facilitate engine cooling and an exhaust port to expel spent engine heated air from the cooling jacket.

2. The internal combustion engine of claim 1, wherein the flywheel which rotates to store kinetic energy as an alternate power source in the absence of energy produced by an ignited fuel.

3. The internal combustion engine of claim 1, wherein fuel combustion through ignition by an electrical system is controlled by the data processor.

4. The internal combustion engine of claim 1, comprising combustion, of a fueled atmosphere, to the point of ignition through compression, in a cylinder, by each piston, driven by the respective cam, of the cam shaft, controlled by the data processor.

5. The internal combustion engine of claim 1, comprising fuel insertion into each combustion chamber through carburization.

6. The internal combustion engine of claim 1, comprising fuel insertion into each combustion chamber through injection.

7. The internal combustion engine of claim 1, wherein fuel usage alternates with stored, rotational kinetic energy of the flywheel to power a vehicle under control of information fed from at least one remote sensor of the data processor.

8. The internal combustion engine of claim 1, comprised of at least one data processing program, resident to the data processor, hosting a series of remote connected sensors which monitor, at least, operating parameters, of coasting, braking, idling and rolling motion of a vehicle, to efficiently modulate burning of fuel, in ratio to vehicle powering kinetic energy of the flywheel.

9. The internal combustion engine of claim 1, comprising the rotation of the flywheel by the at least one second mechanically connected motor-generator, powered by the first motor-generator, rotationally energized by rolling motion of the at least one mechanically connected, tractioned drive wheel of a host vehicle.

10. The internal combustion engine of claim 1, comprising engine starting by spinning the flywheel.

11. The internal combustion engine of claim 1, comprising engine starting by spinning the flywheel with at least one mechanically connected ancillary energy producing source, including an electric motor powered by a battery.

12. The internal combustion engine of claim 1, comprising engine starting by spinning the flywheel with at least one mechanically connected ancillary energy producing source, including a tensioned spring.

13. The internal combustion engine of claim 1, comprising the first clutch plate of the cam shaft configured to disengage the flywheel from a load to freely spin using stored kinetic energy.

14. The internal combustion engine of claim 1, wherein fuel usage alternates with stored, rotational kinetic energy of the flywheel, under control of at least one data processor program, resident to the data processor, to provide locomotion to a host vehicle.

15. The internal combustion engine of claim 1, comprised of the first motor-generator utilizing the rotating kinetic energy of the flywheel to power at least one electric motor mechanically connected to the at least one tractioned drive wheel of a host vehicle for vehicular locomotion.

16. The internal combustion engine of claim 1, wherein the data processor modulates the ratio of ignited fuel to power the flywheel versus the use of kinetic energy stored in the flywheel to propel a host vehicle, to maximize the efficient use of ignited fuel.

17. The internal combustion engine of claim 1, wherein the data processor modulates the bi-directional flow of energy between the first motor-generator, and the at least one mechanically connected motor-generator of the at least one traction wheel.

18. The internal combustion engine of claim 1, comprising a magneto to power an electrical ignition system, in addition to the data processor.

* * * * *